US007545075B2

(12) United States Patent
Huang et al.

(10) Patent No.: US 7,545,075 B2
(45) Date of Patent: Jun. 9, 2009

(54) CAPACITIVE MICROMACHINED ULTRASONIC TRANSDUCER ARRAY WITH THROUGH-SUBSTRATE ELECTRICAL CONNECTION AND METHOD OF FABRICATING SAME

(75) Inventors: Yongli Huang, San Jose, CA (US); Xuefeng Zhuang, Stanford, CA (US); Butrus T. Khuri-Yakub, Palo Alto, CA (US); Ching-Hsiang Cheng, Menlo Park, CA (US); Arif S. Ergun, Mountain View, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 627 days.

(21) Appl. No.: 11/144,184

(22) Filed: Jun. 4, 2005

(65) Prior Publication Data

US 2006/0075818 A1 Apr. 13, 2006

Related U.S. Application Data

(60) Provisional application No. 60/577,102, filed on Jun. 4, 2004.

(51) Int. Cl.
*H02N 1/00* (2006.01)
*H04R 19/00* (2006.01)

(52) U.S. Cl. ....................................... 310/309; 367/181

(58) Field of Classification Search ................. 367/181; 310/309
See application file for complete search history.

(56) References Cited

U.S. PATENT DOCUMENTS 6,443,901 B1 * 9/2002 Fraser ........................ 600/459
6,632,178 B1 * 10/2003 Fraser ........................ 600/459
6,831,394 B2 * 12/2004 Baumgartner et al. ....... 310/334
2004/0267134 A1 * 12/2004 Hossack et al. ............ 600/459
2005/0075572 A1 * 4/2005 Mills et al. .................. 600/459
2005/0096546 A1 * 5/2005 Hazard et al. ............... 600/447

FOREIGN PATENT DOCUMENTS

WO WO-2005/084284 A2 * 9/2005

* cited by examiner

*Primary Examiner*—Thomas M Dougherty
(74) *Attorney, Agent, or Firm*—Perkins Coie, LLP

(57) ABSTRACT

The embodiments of the present invention provide a CMUT array and method of fabricating the same. The CMUT array has CMUT elements individually or respectively addressable from a backside of a substrate on which the CMUT array is fabricated. In one embodiment, a CMUT array is formed on a front side of a very high conductivity silicon substrate. Through wafer trenches are etched into the substrate from the backside of the substrate to electrically isolate individual CMUT elements formed on the front side of the substrate. Electrodes are formed on the backside of the substrate to individually address the CMUT elements through the substrate.

27 Claims, 7 Drawing Sheets

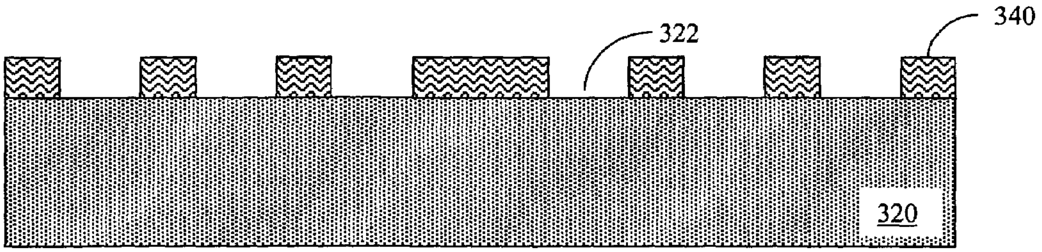
FIG. 3.1
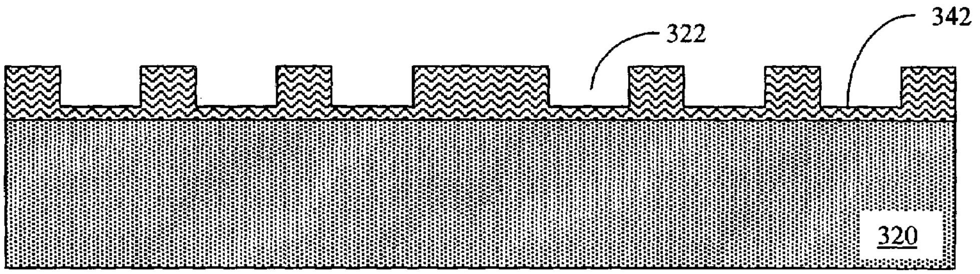
FIG. 3.2
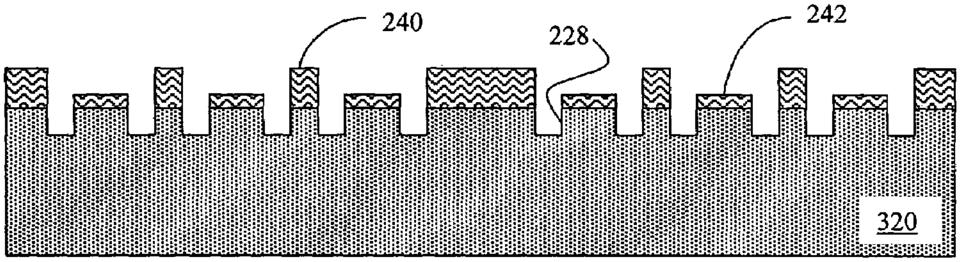
FIG. 3.3
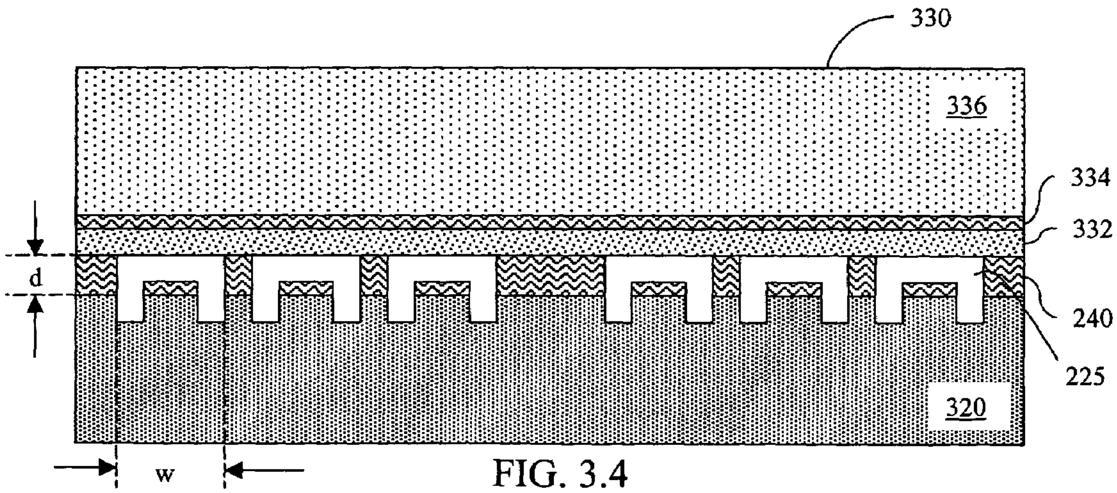
FIG. 3.4

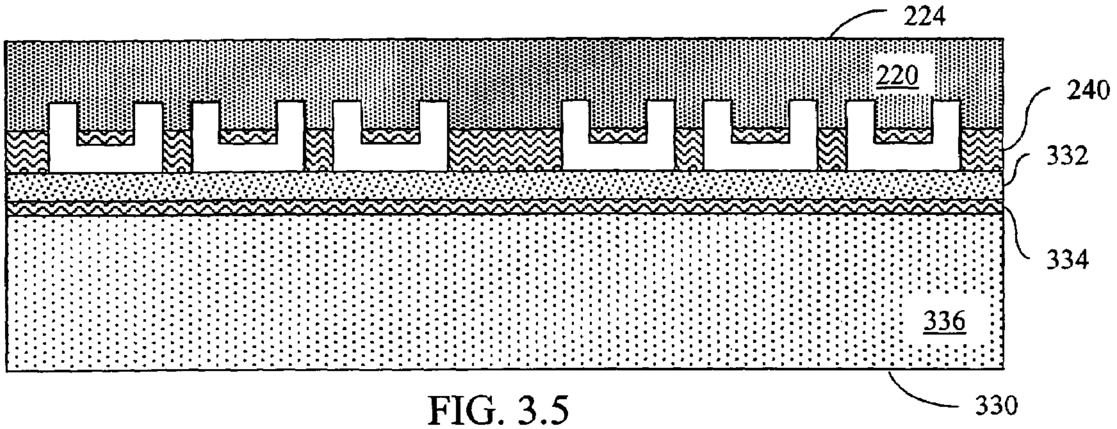
FIG. 3.5
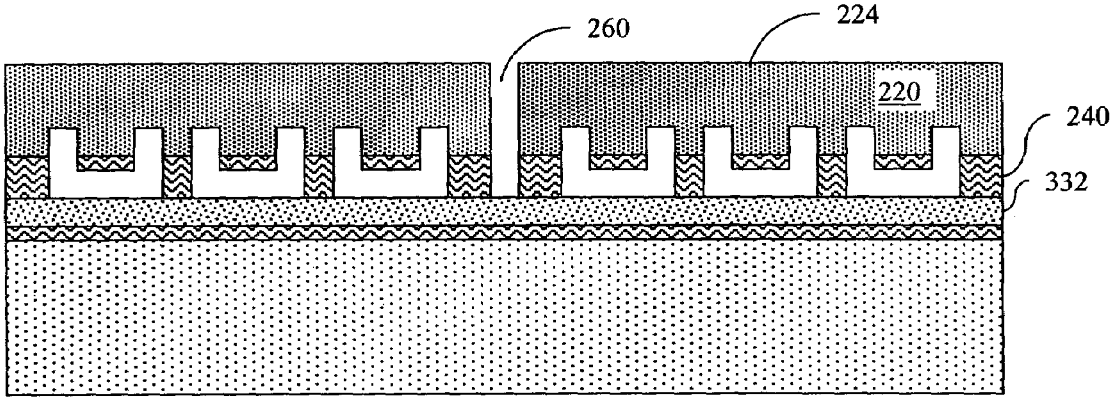
FIG. 3.6
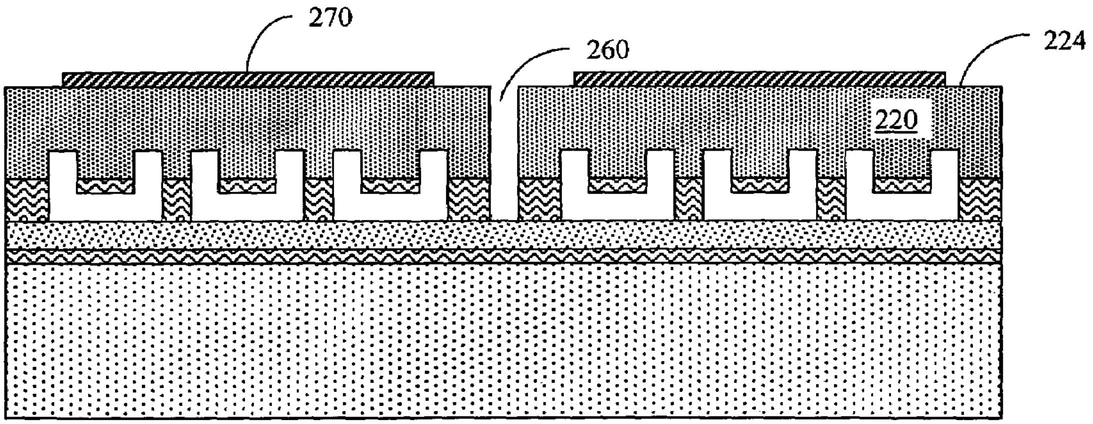
FIG. 3.7

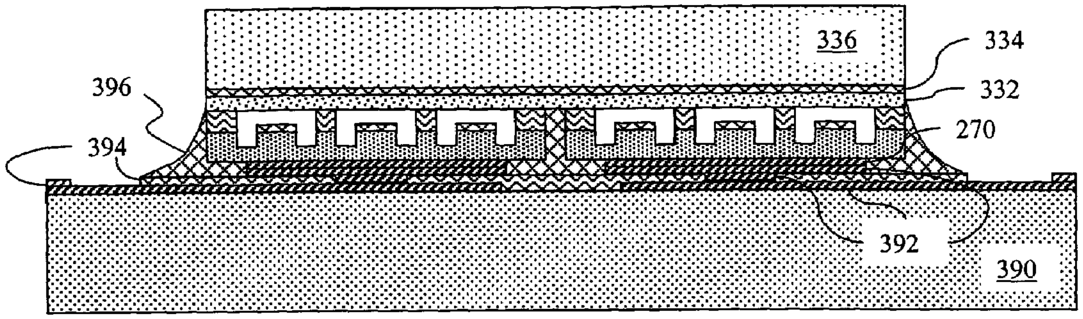
FIG. 3.8
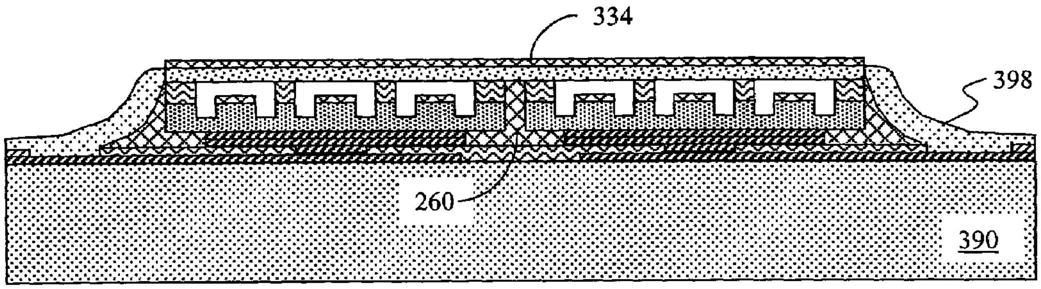
FIG. 3.9
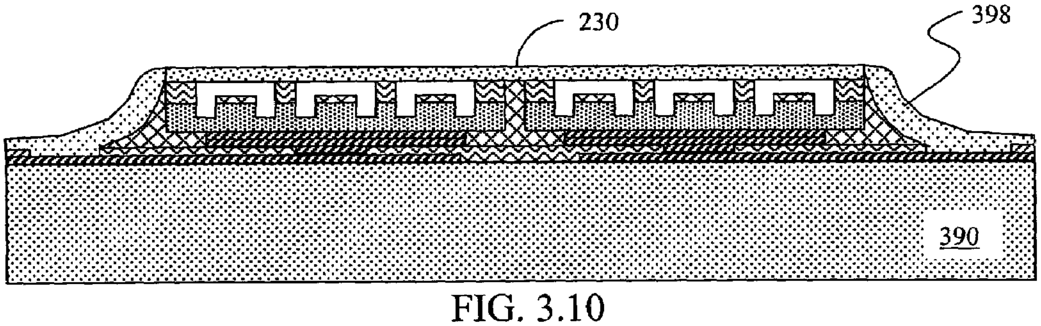
FIG. 3.10
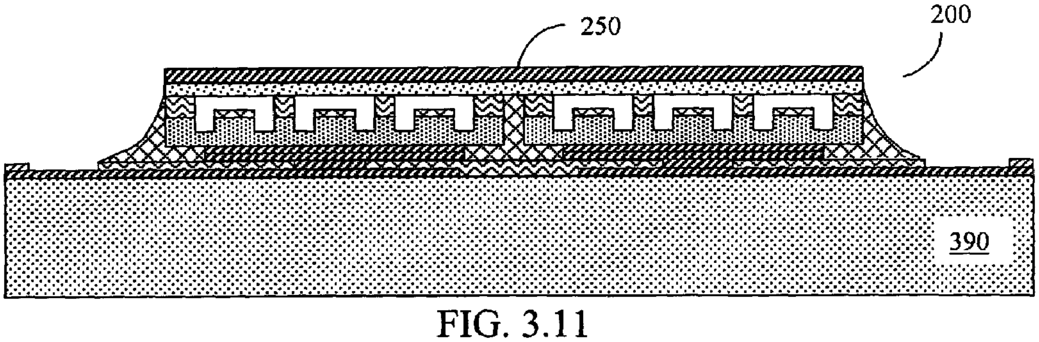
FIG. 3.11

CAPACITIVE MICROMACHINED ULTRASONIC TRANSDUCER ARRAY WITH THROUGH-SUBSTRATE ELECTRICAL CONNECTION AND METHOD OF FABRICATING SAME

CROSS REFERENCE TO RELATED APPLICATIONS

The present application claims the benefit of U.S. Provisional Patent Application No. 60/577,102 filed on Jun. 4, 2004, the entire content of which is incorporated herein by reference.

FEDERALLY-SPONSORED RESEARCH OR DEVELOPMENT

This invention was made with Government support under contracts N00014-02-1 -0007 awarded by the Department of the Navy, Office of Naval Research and CA099059 awarded by the National Institutes of Health. The Government has certain rights in this invention.

FIELD OF THE INVENTION

The present application relates to ultrasonic sensors and actuators, and more particularly to capacitive micromachined ultrasound transducers (CMUT).

BACKGROUND OF THE INVENTION

Capacitive micromachined ultrasound transducers (CMUT) have emerged as a viable alternative to traditional piezoelectric transducers. In general, a CMUT is essentially a micron-sized air-gap or vacuum-gap capacitor that, by electrostatic effects, can be used for the generation and detection of acoustic/ultrasonic waves. Applications of CMUT arrays include medical ultrasonic imaging and underwater imaging, as well as air applications such as nondestructive evaluation (NDE) and nondestructive testing (NDT).

Conventionally, a CMUT array is usually fabricated on a front side of a silicon substrate using surface micromachining technologies. For ease of fabrication and access to the individual CMUT cells, a control electrode for accessing each CMUT cell is also formed on the front side of the silicon substrate. This arrangement makes inefficient use of the surface area on the front side of the silicon substrate, and requires long routing lines to address the CMUT cells, especially for two-dimensional CMUT arrays. The long routing lines can introduce parasitic capacitance and resistance, resulting in sub-optimal performance of the CMUT array.

SUMMARY OF THE INVENTION

The embodiments of the present invention provide a CMUT array having CMUT elements that can be individually or respectively addressed from a backside of a substrate on which the CMUT array is fabricated.

In one embodiment, a CMUT array comprises a substrate having a front side and a backside, dielectric walls formed on the front side of the substrate, a membrane layer supported by the dielectric walls, and electrodes on the backside of the substrate that are isolated from each other to allow control of the CMUT array through the substrate. The substrate can be a very high conductivity silicon substrate. Through wafer trenches can be etched into the substrate from the backside of the substrate to electrically isolate individual CMUT elements formed on the front side of the substrate. The CMUT array may also comprise a common electrode shared by at least some of the elements in the array. The common electrode is formed over or within the membrane layer.

The CMUT elements in the CMUT array can thus be individually or respectively addressed through the substrate on which the array is formed. This helps to increase the utilization efficiency of the real estate on the front side of the substrate while providing better device performance.

The embodiments of the present invention also provides a method for fabricating the CMUT device, which comprises forming a plurality of dielectric walls on a front side of a substrate, forming a membrane layer over the dielectric walls, and removing a portion of the substrate. The method may further comprises etching trenches through the substrate from a backside of the substrate. The trenches provide isolation between CMUT elements in the CMUT device and allow addressing the CMUT elements individually or respectively from the backside of the first substrate.

BRIEF DESCRIPTION OF THE DRAWINGS

The invention will be more clearly understood from the following description when read in connection with the accompanying drawings. Because many structures in the embodiments of the present invention may have sizes smaller than a micron, the drawings are intentionally drawn out of scale in order to illustrate more clearly the features of the embodiments, and are therefore not to scale with real devices.

FIGS. 3.1 through 3.11 are cross-sectional views of a CMUT array bonded to a control circuit being fabricated using the method illustrated in the flowchart of FIG. 3.

DESCRIPTION OF PREFERRED EMBODIMENT(S)

Figure 1:
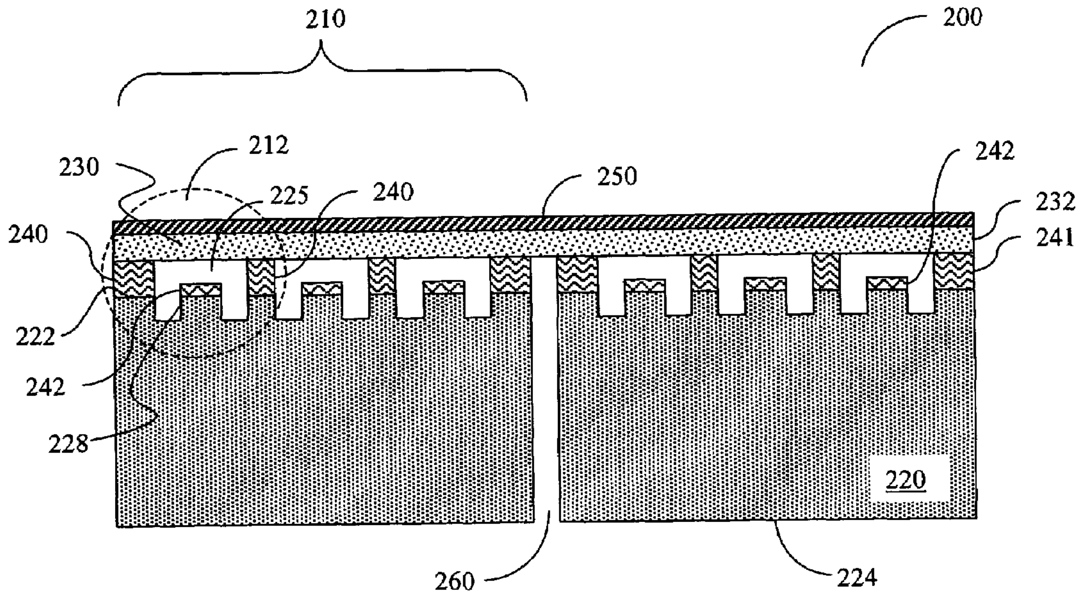
FIG. 1 is a cross-sectional view of a CMUT array with a trench etched through a substrate according to one embodiment of the present invention.
Figure 2:
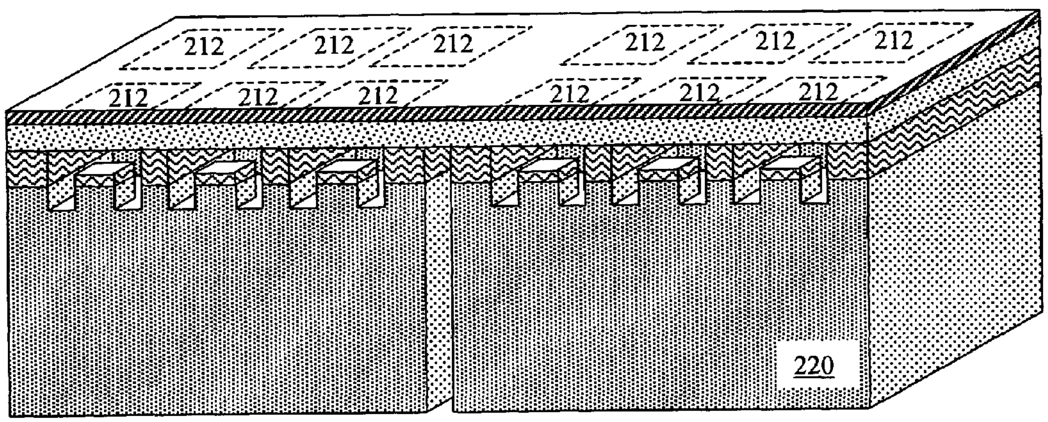
FIG. 2 is a perspective cross-sectional view of the CMUT array of FIG. 1.

Referring to FIGS. 2A and 2B, a CMUT array 200 according to one embodiment of the present invention comprises CMUT array elements 210. While FIGS. 2A and 2B each only shows two CMUT array elements 210, it is apparent that a CMUT array in accordance with the present invention can compromise a number of elements arranged in a one or two-dimensional configuration. As shown in FIG. 2A, each array element 210 includes one or more CMUT cells 212 formed on a high conductivity semiconductor substrate 220. Each CMUT cell 212 includes a membrane 230 supported by dielectric walls 240 over a top surface 222 of the substrate 220, and an ultrasonic gap or cavity 225 defined by the membrane 230, the insulating walls 240, and the top surface 222 of the substrate 220. The dielectric walls 240 are part of a first dielectric layer 241 formed over the top surface 222 of the substrate 220, and the membrane 230 is part of a membrane layer 232. An example of the first dielectric layer 241 is a silicon dioxide film. Other dielectric films such as silicon nitride may also be used as the dielectric layer 241.

Each cell 212 may further include a second dielectric (e.g., oxide) film 242 covering at least a portion of the top surface 222 of the substrate 220 at the bottom of the gap 225 to prevent shorting of the membrane 230 to the substrate 220. A metal conductor thin film 250 can be formed on a top surface of the membrane layer 230 to serve as a common electrode shared by at least some of the CMUT elements 210 in the CMUT array 200. A control electrode for each element 212 is formed using a portion of the high conductivity semiconductor substrate 220. Isolation trenches 260 are formed in the substrate 220 and extend from a backside 224 of the substrate 220 through the substrate 220 and preferably the insulating layer 241 to the membrane 230, as shown in FIGS. 2A and 2B. Adjacent array elements are isolated from one another by isolation trenches 260 and are therefore individually addressable from the backside 224 of the high conductivity semiconductor substrate 220.

In one embodiment, the substrate 220 is made of highly doped silicon. The isolation trenches 260 are formed by etching through the substrate 220 and the insulating film 241 from the backside 224 of the substrate 220. These trenches 260 can be left unfilled or can be filled with an insolating material that has a low dielectric constant. In this way, very high isolation between adjacent elements can be achieved. In addition, the width of the trenches can be adjusted to lower capacitive coupling between CMUT elements 210 to negligible levels. Thus, in one embodiment of the present invention, a CMUT array structure is provided for addressing individual array elements with a low RC time constant, making it suitable for an ideal interconnect scheme for connecting the CMUT array 200 to a control and/or readout circuit.

In one embodiment, the top surface 222 of the substrate 220 are etched to form deeper cavities 225. To prevent the membrane from collapsing, an island or plateau 228 is allowed to remain on the top surface 222 in each cell 212, and the dielectric film 242 is formed over the island or plateau 228.

Each CMUT element 210 may comprise a plurality of CMUT cells 212 arranged in a one-dimensional or two-dimensional configuration. FIG. 2B shows that the CMUT cells 212 in each CMUT element being arranged in a two-dimensional configuration. Although FIG. 2B shows that the CMUT cells 212 are square-shaped in a top-down view, they can be circular, or octagonal, or even rectangular and elongated in a long dimension that is several times the length of a short dimension, or some other shape. In another embodiment, some of the support walls 240 are posts such that part or all of the membrane layer 232 appears as one continuous tent supported by the posts and that the cells 212 in each element 210 or in the whole array 200 all share the same vacuum or air cavity 225.

Figure 3:
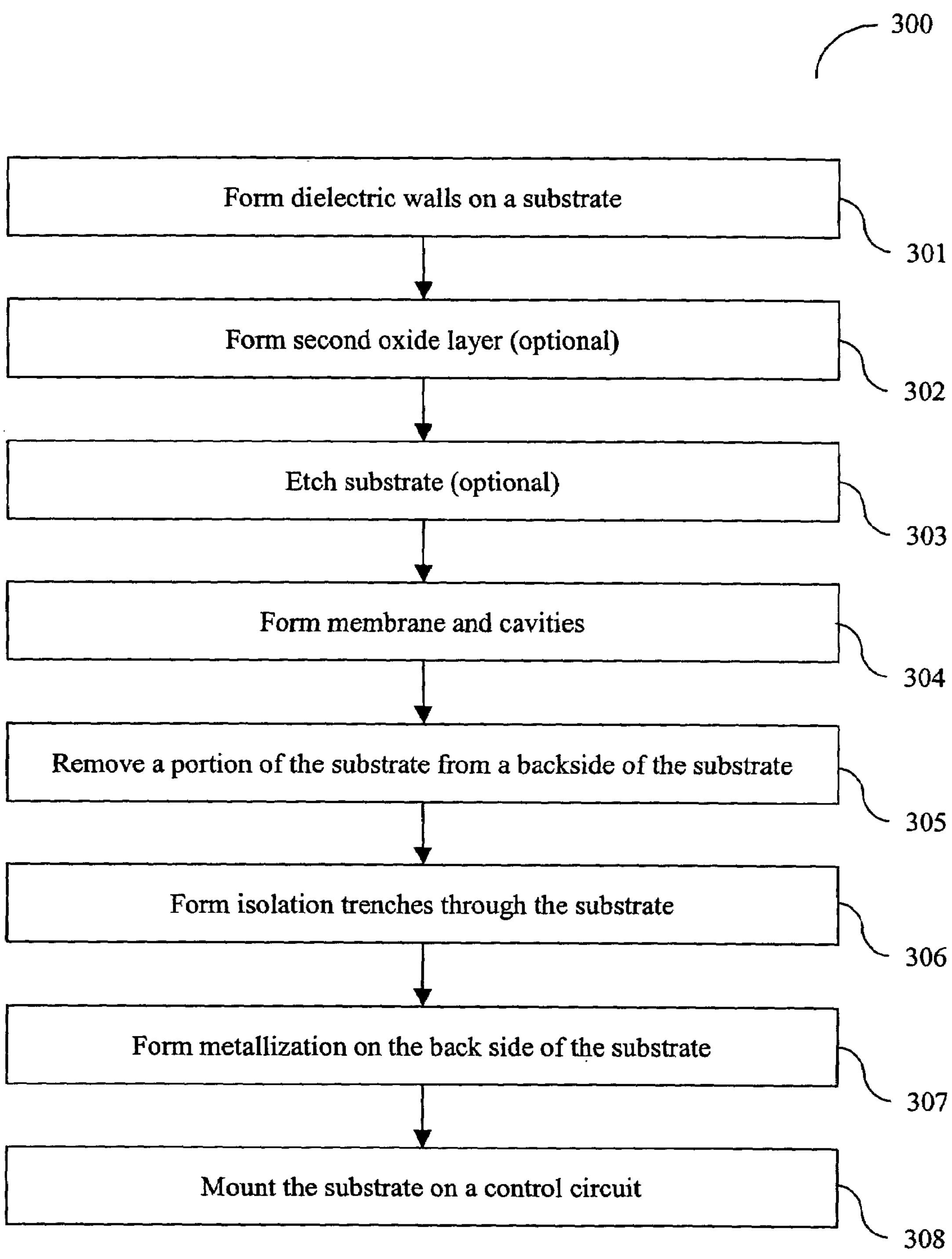
FIG. 3 is a flowchart of the fabrication steps in a method for fabricating a CMUT array bonded to a control circuit according to one embodiment of the present invention.

FIGS. 3 and 3.1 through 3.11 illustrate a process 300 for fabricating the CMUT array 200 and connecting the CMUT array 200 to a control circuit. As shown in FIGS. 3 and 3.1, process 300 comprises step 301 in which dielectric walls 340 are formed over a high-conductivity semiconductor substrate 320 to define the CMUT cells 212. The dielectric walls 340 may be formed by, for example, thermally oxidizing a top surface 322 of the semiconductor substrate 320 to form a blanket thermal oxide layer, and masking and etching the blanket oxide layer to form a series of oxide walls 340. As shown in FIGS. 3, 3.2, and 3.3, process 300 further comprises step 302 in which a second oxide layer 342 is formed by, for example, thermally oxidization, to cover at least a portion of the top surface 322 of the substrate not covered by the oxide walls 340. Process 300 further comprises an optional step 303 in which the top surface 322 of the substrate is etched, as shown in FIGS. 3 and 3.3. While performing step 303, the top surface 322 of the substrate 320 may be masked so that islands or plateaus 228 remain after the etch step. Portions of the second oxide layer 342 are left covering the islands or plateaus 228 and serves as the oxide layer 242 for each CMUT cell. Oxide walls 340 also become dielectric walls 240 for the CMUT cells. Step 303 may be performed before step 302 using the oxide walls 340 as mask if the islands or plateaus 328 are not wanted.

As shown in FIG. 3, process 300 further comprises step 304 in which a membrane layer is formed over the dielectric walls 240 and cavities are formed between the membrane layer and the dielectric walls 240. In one embodiment, step 304 is performed using wafer bonding whereby dielectric walls 240 on the substrate 320 is fusion bonded to another wafer 330, which comprises a layer of a first material 332 over a substrate 336. The layer of the first material 332 may be separated from the substrate 336 by a layer of a second material 334. In one embodiment, the wafer 330 is a silicon-on-insulator (SOI) substrate or wafer 330, which comprises an intrinsic single crystal silicon layer 332 over an insulating layer 334 formed on a semiconductor substrate 336. Cavities 225 are thus formed between the substrate 320 and the single crystal silicon layer 332, which serves as the membrane 230 for the CMUT cells. Single crystal silicon is chosen here to form the membrane because of its good mechanical properties and because SOI wafers are relatively easy to obtain. Other materials can also be formed on the substrate 336 and be bonded with the dielectric walls 240 to serve as membranes, Examples of these other materials include aluminum oxide, diamond, etc.

Step 304 can be performed in a vacuum so that cavities 225 are vacuum cavities. Prior to bonding, the single crystal surface on wafer 330 is cleaned and activated. In one exemplary embodiment, step 304 is performed with a bonder at about $10^{-5}$ mbar vacuum, at a temperature of about 150° C. After bonding, the substrate 320 with the wafer 330 attached thereto are annealed at high temperature, such as 1100° C., for a certain period of time such as two hours, to make the bond permanent. See also Huang, et al., "Fabricating Capacitive Micromachined Ultrasonic Transducers with Wafer-Bonding Technology," Journal of Microelectromechanical Systems, Vol. 12, No. 2, April 2003, which is incorporated herein by reference.

Alternatively, step 304 may be performed using traditional surface micro-machining techniques. For example, the cavities for the CMUT cells can be formed by first forming a sacrificial layer to occupy the spaces for the cavities and then covering conformably the sacrificial layer with the membrane. Small holes or vias are etched through the membrane to access the sacrificial layer, and after removing of the sacrificial layer through the holes with a wet etch process, the holes or vias are refilled or sealed under vacuum to create vacuum sealed gaps or cavities for the CMUT cells. After the membrane layer is formed, a backing substrate can be adhered to the membrane using a dissolvable adhesive, such as photoresist. The backing substrate can be used to protect the membrane layer and to provide mechanical robustness during the performance of some subsequent steps in process 300, as discussed below. Compared to the traditional micromachining techniques, the wafer bonding technique has many advantages, some of which are discussed in the following.

First of all, wafer bonding is easier to perform than the complex via open and refill process associated with the surface micromachining techniques. The vacuum obtained using wafer bonding is also superior than that obtained using surface micro-machining, because unlike wafer bonding, which can be performed in higher vacuum, surface micro-machining is limited by the working pressure (e.g., 200-400 mTorr) associated with a low-pressure chemical vapor deposition (LPCVD) process. Moreover, wafer bonding avoids the via refill process, which often introduces unwanted materials onto the membrane's inner surface.

Still further, wafer bonding does not require the formation of vias. Thus, the areas formerly taken by vias on the front side 322 of the substrate 320 can now be utilized by active CMUT cells, resulting in a larger and/or denser CMUT array being formed on the substrate 320. Furthermore, because the cavity walls 341 and the membrane 332 are formed on separate wafers, the wafer bonding technique allows the cavity shape to be independent upon the shape of the membrane and provides more flexibility in designing CMUT devices with different sized and shaped membranes. This translates into fewer limitations on the device design when trying to obtain a desired dynamic response, membrane mode shape or mode separations. The aspect ratio, i.e., the ratio of the depth d to the width w, as shown in FIG. 3.4, of the cavity 225 is also no longer limited by the usually slow sacrificial layer etch process. Furthermore, the wafer bonding technique allows the membrane to be made of single crystal silicon and any other material that can have better mechanical properties because there are fewer internal defects and lower internal mechanical loss than thin-film deposited materials. The single crystal membrane should improve the reliability as well as the performance of the CMUT device. Thus, by using the SOI wafer to form the membrane, better uniformity, stress controllability, and process repeatability can be achieved, making it possible to commercially explore the CMUT fabrication process. Finally, with the substrate 336 of the SOI wafer 330 as a backing, there is no need to adhere another backing substrate to the membrane layer 332 in order to perform some of the subsequent steps in process 300, as discussed below.

As shown in FIGS. 3 and 3.5, process 300 further comprises step 305 in which a portion of the substrate 320 is removed by, for example grinding and polishing at a backside 224, to become substrate 220. The thickness T of the substrate 220 can be adjusted to suit various acoustic applications. For example, the thickness T can be selected to push substrate ringing modes out of an operating range of the CMUT array being fabricated. Substrate ringing modes have been observed both experimentally and theoretically in CMUT transducers, especially in immersion transducers at frequencies above 5 MHz, and are attributed to the thickness resonance of the substrate on which the transducers are formed. These ringing modes may interfere with imaging using the CMUT transducers if they occur within the frequency band in which the CMUT transducers are designed to operate. Conventional means of eliminating the ringing modes include placing a judiciously designed (matched and lossy) backing material in contact with the substrate. See Ladabaum and Wagner, "Silicon Substrate Ringing in Microfabricated Ultrasonic Transducers," 2000 IEEE Ultrasonics Symposium, which is incorporated herein by reference. Step 305 in process 300 allows adjustment of the thickness T of the substrate 220 and thus the substrate ringing modes, eliminating the need for the high precision backing. A thinner substrate 220 also results in reduced parasitic capacitance and resistance associated with addressing the CMUT array elements.

Referring to FIGS. 3 and 3.6, process 300 further comprises step 306 in which isolation trenches 260 through the substrate 220 are formed by, for example masking and etching from the backside 224 using, for example, deep reactive ion etching (DRIE). The isolation trenches 260 isolate individual CMUT elements from each other and allow control of the individual CMUT elements from the backside 224 of the substrate. The trenches should extend all the way through the substrate 220 and preferably to the silicon membrane 332. In one embodiment, step 306 includes a silicon dry etching process to etch through the substrate 220 and stopping at an interface between the substrate 220 and the oxide walls 240. Preferably, step 306 also includes an oxide dry etch process to etch through the oxide walls 240 and stopping at the single crystal layer 332.

Referring to FIGS. 3 and 3.7, process 300 further comprises a step 307 in which a layer 270 of a metallic material, such as aluminum, is formed over the backside 224 of the substrate 220 by, for example, sputtering or physical vapor deposition (PVD), and the metal layer 270 is masked and etched to provide electrical connection of individual CMUT elements to separate terminals in a control circuit (not shown). Step 307 may be performed either prior to or after step 306.

Referring to FIGS. 3 and 3.8, in one embodiment, the control circuit, such as an ASIC circuit, includes layers of metallization 392 separated by one or more dielectric layers 394 on a separate substrate 390, and process 300 further comprises step 308 in which the substrate 220 with the wafer 330 bonded thereto is mounted onto the control circuit. In one embodiment, the substrate is diced and flip-chip bonded to the control circuits using conventional flip-chip packaging techniques, with the backside 224 of the substrate 220 facing the control circuit. An underfill process may also be performed in step 308 either simultaneously with the flip-chip bonding or subsequently to fill gaps between the substrates 220 and 390 with an epoxy material 396. The epoxy material 396 may also fill the isolation trenches 260.

Afterwards, the silicon substrate 336 of the SOI wafer 330 is removed, as shown in FIG. 3.9. Before removal of the silicon substrate 336, a protective layer 398 made of, for example, photoresist, may need to be placed over part of the substrate 390 not covered by the substrate 320 to prevent the substrate 390 and the circuits formed thereon from being damaged by the etchant used to remove the silicon substrate 336. The silicon substrate 336 may also be removed by dissolving the oxide layer 334 in, for example, hydrofluoric acid. In the embodiments that the membrane layer is formed using micromachining and a backing or support substrate is adhered to the membrane layer by an adhesive such as photoresist, the backing substrate can simply be removed using, for example, acetone, which releases the support substrate without affecting other layers of materials.

The dielectric layer 334 in the SOI wafer 330 may also be removed after the removal of the silicon substrate 336 by, for example, wet etching, as shown in FIG. 3.10, leaving the intrinsic silicon layer 332 to serve as the membrane layer 231 for the CMUT cells. Thereafter, a layer 350 of a metallic material, such as aluminum, is formed over membrane layer 231 to serve as the common electrode for the CMUT elements. The protective layer 398 is then removed, leaving the CMUT array 200 attached to the control circuit on substrate 390.

Figure 4:
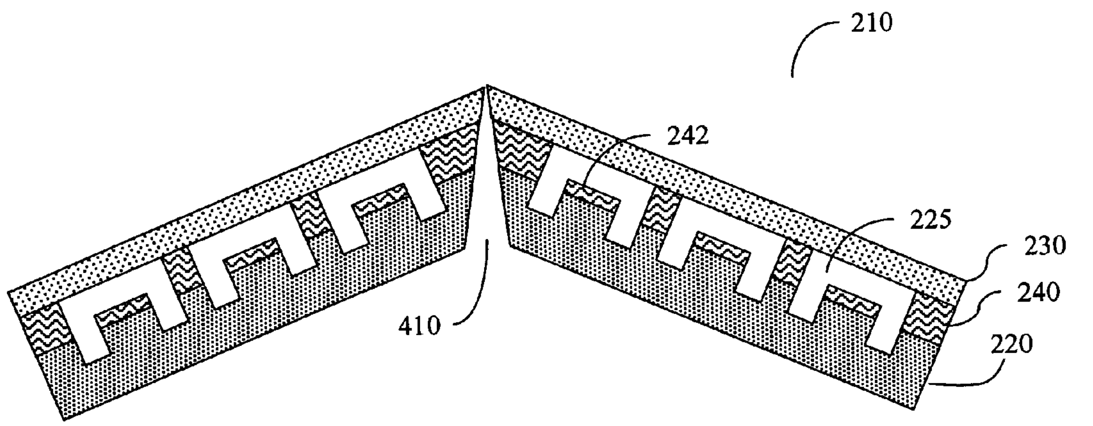
FIG. 4 is a cross-sectional view of a two-element CMUT array folded to direct ultrasonic waves radially outward.
Figure 5:
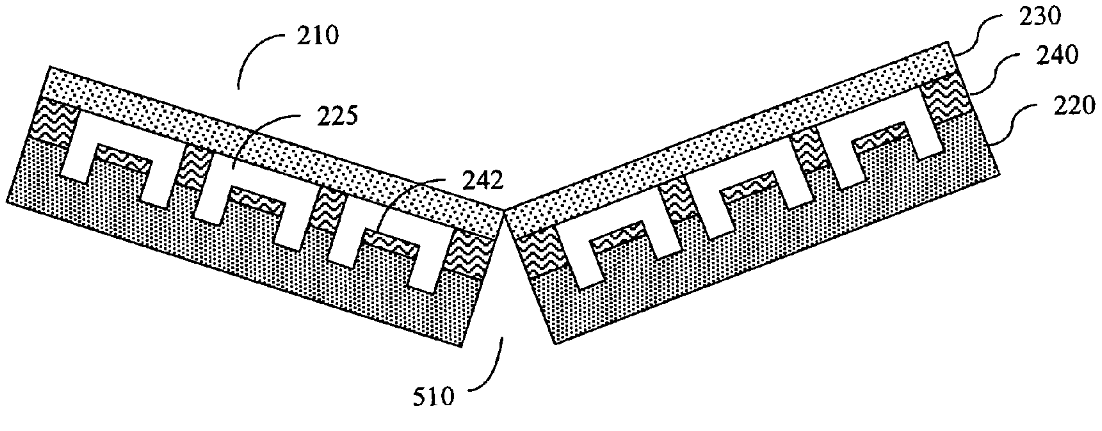
FIG. 5 is a cross-sectional view of another embodiment of a two element CMUT array folded to focus ultrasonic waves.
Figure 6:
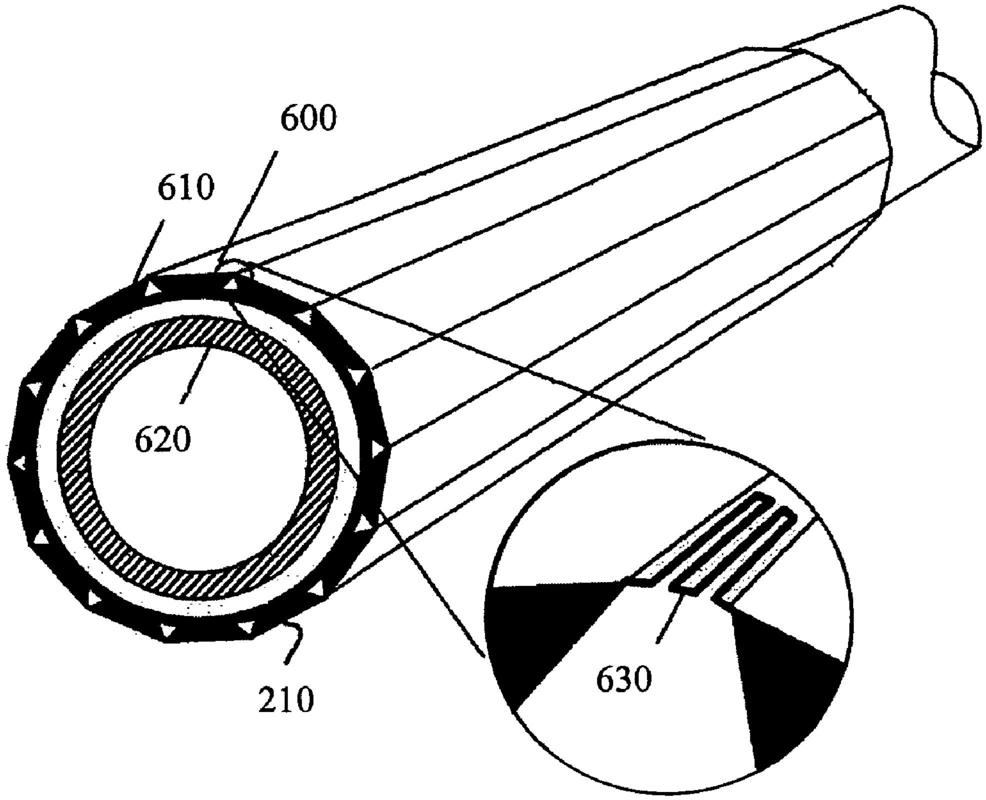
FIG. 6 is a sectioned perspective view of a catheter employing a folded CMUT array according to one embodiment of the present invention.
Figure 7:
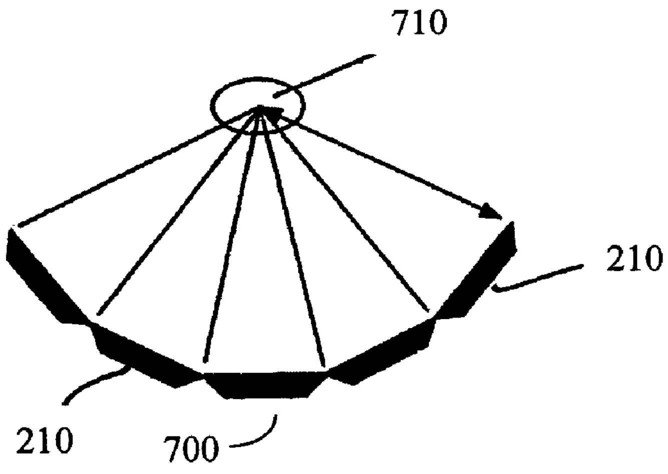
FIG. 7 is a schematic view of a CMUT array configured to focus on an area of interest according to one embodiment of the present invention.

Instead of flip-chip bonding to a control circuit on a flat substrate, the CMUT elements 210 may be joined together in different configurations as a non-planer array. For example, as shown in FIG. 4, each CMUT element 210 may be cut in the form of a wedge so that the CMUT elements may be folded to face radially outward. A space 410 is left between neighboring CMUT elements 210 for isolation, which space can be filled with a dielectric material. An example of an application for folded CMUT elements is with a catheter, where a folded CMUT array 600 including CMUT elements 210 is mounted on a flexible substrate 610 such as a flexible printed circuit board (PCB) with the backside 224 of the substrate 220 facing the PCB and wrapped around the catheter 620, as shown in FIG. 6. Spring connection 630 may be provided between neighboring CMUT elements 210. The CMUT elements 210 may also be folded to face radially inward, as shown in FIG. 5, so that the ultrasonic signals generated therefrom are focused to an area, as shown in FIG. 7. Again, a space 510 is left between neighboring CMUT elements 210 for isolation, which space can be filled with a dielectric material.

The foregoing descriptions of specific embodiments and best mode of the present invention have been presented for purposes of illustration and description only. They are not intended to be exhaustive or to limit the invention to the precise forms disclosed. For example, the approach taken to design and fabricate the CMUT devices, as discussed above, is also applicable to other types of sensors and actuators, such as optical micromirror arrays, where the array elements are formed on a front side of a substrate and each array element operates by connecting to a control circuit via two electrodes including a control electrode. The control electrode for each array element can be formed on a backside opposite to the front side of the substrate as the CMUT array 200 discussed above and using methods similar to the process 300 discussed above. Specific features of the invention are shown in some drawings and not in others, for purposes of convenience only, and any feature may be combined with other features in accordance with the invention. Steps of the described processes may be reordered or combined, and other steps may be included. The embodiments were chosen and described in order to best explain the principles of the invention and its practical application, to thereby enable others skilled in the art to best utilize the invention and various embodiments with various modifications as are suited to the particular use contemplated. Further variations of the invention will be apparent to one skilled in the art in light of this disclosure and such variations are intended to fall within the scope of the appended claims and their equivalents.

We claim:

1. A capacitive micromachined ultrasonic transducer (CMUT) structure, comprising:

a plurality of CMUT elements, each CMUT element comprising:

at least one CMUT device that includes:

a high conductivity substrate having a front side and a backside;

an insulating layer disposed on the front side of the high conductivity substrate and forming CMUT device dielectric walls;

a membrane layer supported by the insulating layer dielectric walls;

a cavity formed between the membrane layer and the substrate; and an electrode on the backside of the substrate for controlling of the CMUT device through the substrate; and at least first and second isolation spaces formed in the substrate on at least two sides of the CMUT element and extending from the substrate backside through the substrate to the substrate front side for electrically isolating the plurality of CMUT elements from one another.

2. The CMUT structure of claim 1 attached to a control circuit with the backside of the substrate facing the control circuit.

3. The CMUT structure of claim 1 mounted on a flexible printed circuit board with the backside of the substrate facing the printed circuit board.

4. The CMUT structure of claim 1, further comprising a substrate backside electrode, electrically isolated from substrate backside electrodes of other CMUT elements, for addressing the at least one CMUT device in the respective CMUT element through the substrate.

5. The CMUT structure of claim 1, wherein the first and second isolation spaces comprise at least first and second isolation trenches formed in the substrate and extending from the substrate backside through the substrate to the substrate front side.

6. The CMUT structure of claim 1, wherein the at least one CMUT element comprises a plurality of CMUT elements.

7. The CMUT structure of claim 5, wherein each of the plurality of CMUT elements comprises a plurality of CMUT devices, and each CMUT device is not separated from other CMUT devices by isolation trenches.

8. The CMUT structure of claim 6, wherein the membrane layer is continuous between neighboring CMUT elements and the CMUT structure comprises a plurality of CMUT elements joined by the membrane.

9. The CMUT structure of claim 1, further comprising a second substrate, and the CMUT structure further comprises a plurality of discrete CMUT elements joined by the second substrate.

10. The CMUT structure of claim 9, wherein the second substrate comprises a flexible substrate material.

11. The CMUT structure of claim 1, wherein the membrane is joined to the insulating layer dielectric walls by a fusion bond.

12. The CMUT structure of claim 1, further comprising a metal conductor thin film formed on a top surface of the membrane layer to serve as a common electrode shared by at least some of the CMUT elements in the CMUT structure.

13. The CMUT structure of claim 1, wherein the metal conductor thin film and the membrane layer are formed together and fusion bonded to the insulating layer dielectric walls by a fusion bond.

14. The CMUT structure of claim 5, wherein the isolation trenches extend through the substrate and through the insulating layer to the membrane.

15. The CMUT structure of claim 5, wherein the width of the isolation trenches are adjusted to lower capacitive coupling between CMUT elements to negligible levels.

16. The CMUT structure of claim 1, wherein the CMUT structure provides for addressing individual CMUT elements with a low RO time constant and adapted for interconnection with a control circuit or a readout circuit.

17. The CMUT structure of claim 1, wherein a width of the isolation spaces are adjusted to lower capacitive coupling between CMUT elements to negligible levels.

18. The CMUT structure of claim 1, further comprising a second insulating layer covering at least a portion of the top surface of the substrate at the bottom of the cavity and not forming dielectric walls to prevent shorting of the membrane to the substrate during operation.

19. The CMUT structure of claim 1, wherein the top surface of the substrate is etched toward the substrate backside to extend the cavities into the substrate to form deeper cavities.

20. The CMUT structure of claim 5, wherein the isolation trenches are left unfilled.

21. The CMUT structure of claim 5, wherein the isolation trenches are filled with an insolating material that has a low dielectric constant.

22. The CMUT structure of claim 1, further comprising a metal conductor thin film formed on a top surface of the membrane to serve as a common electrode shared by at least some of the CMUT elements in the CMUT structure.

23. The CMUT structure of claim 1, wherein the CMUT structure includes a plurality of CMUT elements separated by the isolation trenches that are at least one of: (i) folded proximate the isolation trenches so that in operation pressure waves from the CMUT devices directed in a desired direction, (ii) folded inwardly proximate the isolation trenches so that in operation pressure waves from the CMUT devices are focused on a particular region, and (iii) folded outwardly proximate the isolation trenches so that in operation pressure waves from the CMUT devices are directed outwardly.

24. The CMUT structure of claim 5, wherein the isolation trenches are formed in the shape of at least one of a cut, a rectangular slot, and an angled wedge to permit inward folding of adjacent CMUT elements.

25. The CMUT structure of claim 5, wherein the CMUT structure has a folded configuration wherein the plurality of CMUT elements are mounted on a flexible material and joined together by spring connections between neighboring CMUT elements.

26. The CMUT structure of claim 5, wherein the CMUT structure includes a plurality of CMUT elements arranged as a two-dimensional array on a flexible substrate, and the isolation trenches surround each of the plurality of CMUT elements.

27. The CMUT structure of claim 26, wherein the two-dimensional CMUT structure is folded about the isolation trenches to form a three-dimensional non-planar CMUT structure in which a plurality of CMUT elements each carrying a plurality of CMUT devices face different directions.

* * * * *